US012684098B2

(12) United States Patent
Kurota

(10) Patent No.: US 12,684,098 B2
(45) Date of Patent: Jul. 14, 2026

(54) PROJECTION METHOD, PROCESSING DEVICE, AND NON-TRANSITORY COMPUTER-READABLE STORAGE MEDIUM

(71) Applicant: SEIKO EPSON CORPORATION, Tokyo (JP)

(72) Inventor: Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 379 days.

(21) Appl. No.: 18/384,171

(22) Filed: Oct. 26, 2023

(65) Prior Publication Data

US 2024/0146888 A1 May 2, 2024

(30) Foreign Application Priority Data

Oct. 27, 2022 (JP) ................................. 2022-172287

(51) Int. Cl.
*H04N 9/31* (2006.01)
(52) U.S. Cl.
CPC ......... *H04N 9/3185* (2013.01); *H04N 9/3194* (2013.01)
(58) Field of Classification Search
CPC .. H04N 9/3147; H04N 9/3194; H04N 9/3182; H04N 9/3185; H04N 9/31; G03B 21/14; G03B 21/147
USPC ...... 348/744–747, 806, 807; 353/69, 31, 48, 353/94
See application file for complete search history.

(56) References Cited

U.S. PATENT DOCUMENTS

| | | | |
|---|---|---|---|
| 2012/0120372 A1 | 5/2012 | Timoner et al. | |
| 2013/0329196 A1 | 12/2013 | Aruga et al. | |
| 2014/0028553 A1 | 1/2014 | Harland et al. | |
| 2014/0104582 A1 | 4/2014 | Mori | |
| 2016/0100144 A1 | 4/2016 | Aruga et al. | |
| 2017/0127027 A1* | 5/2017 | Naganuma ............. | G09G 3/002 |
| 2019/0124307 A1 | 4/2019 | Oike | |
| 2019/0238807 A1 | 8/2019 | Furui | |

FOREIGN PATENT DOCUMENTS

| | | |
|---|---|---|
| JP | 2013-254051 A | 12/2013 |
| JP | 2014-078872 A | 5/2014 |
| JP | 2015-226851 A | 12/2015 |
| JP | 2019-078786 A | 5/2019 |
| JP | 2019-134312 A | 8/2019 |
| JP | 2021-118465 A | 8/2021 |

* cited by examiner

*Primary Examiner* — Sherrie Hsia
(74) *Attorney, Agent, or Firm* — Oliff PLC

(57) ABSTRACT

A projection method including: when executing a first adjustment including correction of a shape of a first projection image to be projected by a projector, updating a first setting value for correcting the shape of the first projection image by receiving an operation of changing the shape of the first projection image; and projecting, from the projector, a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

7 Claims, 8 Drawing Sheets

PROJECTION METHOD, PROCESSING DEVICE, AND NON-TRANSITORY COMPUTER-READABLE STORAGE MEDIUM

The present application is based on, and claims priority from JP Application Serial Number 2022-172287, filed Oct. 27, 2022, the disclosure of which is hereby incorporated by reference herein in its entirety.

BACKGROUND

1. Technical Field

The present disclosure relates to a projection method, a processing device, a projection system, and a non-transitory computer-readable storage medium.

2. Related Art

In the related art, a technique of adjusting projection images projected by a plurality of projectors is known. For example, JP-A-2014-78872 discloses setting an edge blend to reduce the luminance of an overlapping area where projection images are overlapping, when the projection images are projected by a plurality of projectors. Further, JP-A-2014-78872 discloses that after setting of the edge blend, the projection images are subjected to keystone correction according to a user operation.

Luminance correction such as the edge blend disclosed in JP-A-2014-78872 has a large processing load. Therefore, in a case of executing shape correction such as the keystone correction while executing the luminance correction such as the edge blend, a processing time in adjusting the projection image increases, and it requires time before the adjusted projection image is projected. For this reason, in the related art, in the adjustment of projection images projected by a plurality of projectors, convenience for a user is impaired.

SUMMARY

A projection method according to the present disclosure includes: when executing a first adjustment including correction of a shape of a first projection image to be projected by a projector, updating a first setting value for correcting the shape of the first projection image by receiving an operation of changing the shape of the first projection image; and projecting, from the projector, a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

A processing device according to the present disclosure includes: one or more processors configured to, when executing a first adjustment including correction of a shape of a first projection image to be projected by a projector, update a first setting value for correcting the shape of the first projection image by receiving an operation of changing the shape of the first projection image; and cause the projector to project a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

A projection system according to the present disclosure includes: a projector; and a processing device configured to, when executing a first adjustment including correction of a shape of a first projection image to be projected by the projector, update a first setting value for correcting the shape of the first projection image by receiving an operation of changing the shape of the first projection image; and cause the projector to project a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

A non-transitory computer-readable storage medium storing a program, the program includes: causing one or more processors to, when executing a first adjustment including correction of a shape of a first projection image to be projected by a projector, update a first setting value for correcting the shape of the first projection image by receiving an operation of changing the shape of the first projection image; and cause the projector to project a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

DESCRIPTION OF EMBODIMENTS

1. First Embodiment

Figure 1:
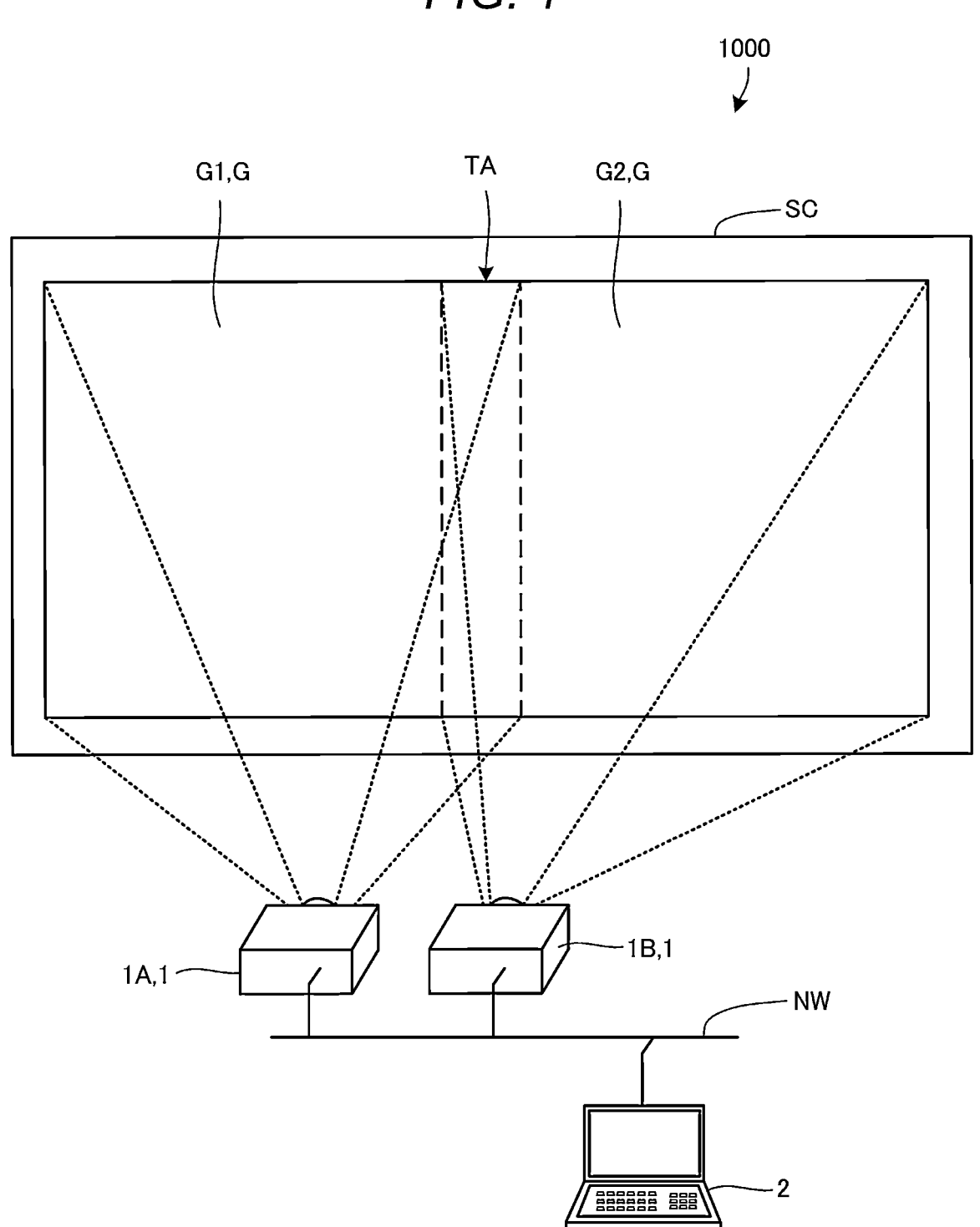
FIG. 1 is a diagram illustrating a configuration of a projection system.

FIG. 1 is a diagram illustrating a configuration of a projection system 1000.

The projection system 1000 according to the embodiment includes a plurality of projectors 1 arranged side by side. The projection system 1000 uses the plurality of projectors 1 to project a plurality of projection images G side by side. The projection system 1000 according to the embodiment projects two projection images G side by side in a left-right direction of a screen SC in the drawing, and forms one large image on the screen SC. The screen SC may be a curtain screen, or a wall surface of a building or a flat surface of an installed object may be used as the screen SC. The screen SC is not limited to a flat surface, and may be a curved surface or a surface having unevenness.

As illustrated in FIG. 1, the projection system 1000 of the embodiment includes two projectors 1, that is, projectors 1A and 1B. The two projectors 1 are arranged in one longitudinal row and two horizontal columns.

In FIG. 1, the number of projectors 1 included in the projection system 1000 is not limited to two, and may be three or more. The plurality of projectors 1 may be arranged in N rows and M columns. Here, N and M are integers of 1 or more.

The projector 1 projects the projection image G onto the screen SC by outputting image light based on image data input from an image supply device. In FIG. 1, the projector 1A displays a first projection image G1 overlapping an edge of a second projection image G2 on the screen SC. In FIG. 1, the projector 1B displays the second projection image G2 overlapping an edge of the first projection image G1 on the screen SC.

The control device 2 is an example of a processing device of the present disclosure.

A projection mode of the projection image G illustrated in FIG. 1 is a mode obtained after the projection image G is appropriately adjusted. The adjustment of the projection image G includes alpha blend, shape correction, white balance correction, color unevenness correction, and the like. The alpha blend is a process of correcting an alpha value of the projection image G to correct a luminance of an overlapping area TA where the projection images G overlap each other, thereby making a boundary between the adjacent projection images G inconspicuous.

The projector 1 is connected to a network NW. The network NW is a network including communication facilities such as a public line network, a dedicated line, and other communication lines, and a specific mode thereof is not limited. For example, the network NW may be a wide area network or a local network. The network NW may include at least one of a wireless communication circuit and a wired communication circuit.

The projection system 1000 includes the control device 2. The control device 2 is connected to the network NW. The control device 2 illustrated in FIG. 1 is a notebook personal computer (PC). The control device 2 is not limited to a notebook PC, and may be an electronic device such as a desktop PC, a tablet terminal, or a smartphone. The control device 2 controls the projector 1 via the network NW. The control device 2 of the embodiment functions as an image supply device. The control device 2 outputs image data to each of the projectors 1A and 1B. The projector 1 projects the projection image G based on the image data received from the control device 2.

Figure 2:
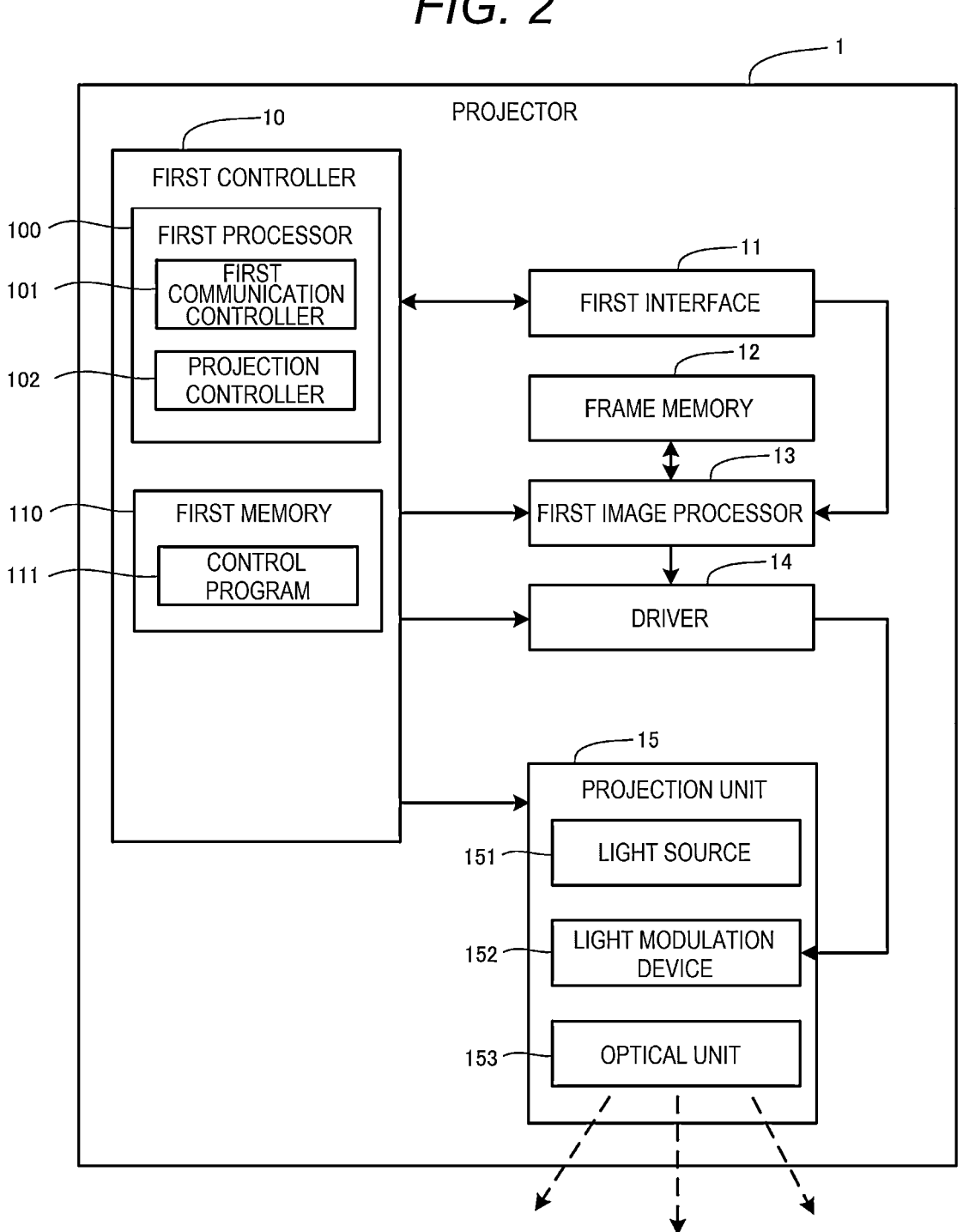
FIG. 2 is a diagram illustrating a configuration of a projector.

FIG. 2 is a diagram illustrating a configuration of the projector 1.

The projector 1 includes a first controller 10.

The first controller 10 includes a first processor 100 configured to execute programs such as a central processor (CPU) and a micro-processor (MPU), and a first memory 110, and controls each unit of the projector 1. Functional units of the first processor 100 will be described later.

The first memory 110 stores programs to be executed by the first processor 100 and data processed by the first processor 100. The first memory 110 stores a control program 111 to be executed by the first processor 100 and other various types of data. The first memory 110 includes a nonvolatile storage area. The first memory 110 may include a volatile storage area and constitute a work area of the first processor 100. The first memory 110 includes, for example, a read only memory (ROM) and a random access memory (RAM).

The projector 1 includes a first interface 11.

The first interface 11 includes a connector, an interface circuit and the like conforming to a predetermined communication standard. The first interface 11 transmits and receives image data, control data, and the like to and from an external device according to the predetermined communication standard under the control of the first controller 10. The image data transmitted and received by the first interface 11 may be still image data or moving image data, and may be accompanied by audio data. The first interface 11 of the embodiment communicates with the control device 2 via the network NW and receives image data of the projection image G from the control device 2.

The projector 1 includes a frame memory 12 and a first image processor 13.

The frame memory 12 and the first image processor 13 are implemented by an integrated circuit, for example. The integrated circuit includes an LSI, an application specific integrated circuit (ASIC), a programmable logic device (PLD), a field-programmable gate array (FPGA), a system-on-a-chip (SoC), and the like. An analog circuit may be provided in a part of the configuration of the integrated circuit, and the first controller 10 and the integrated circuit may be combined.

The frame memory 12 includes a plurality of banks. Each bank has a storage capacity capable of writing one frame. The frame memory 12 includes, for example, a synchronous dynamic random access memory (SDRAM).

The first image processor 13 performs, on image data loaded in the frame memory 12, image processing such as resolution conversion processing or resizing processing, distortion aberration correction, geometric correction processing, digital zoom processing, and an adjustment of hue and luminance of an image. The first image processor 13 performs processing designated by the first controller 10, and performs the processing by using a parameter input from the first controller 10 as necessary. In addition, the first image processor 13 can execute a combination of a plurality of types of image processing among the image processing described above. The first image processor 13 outputs the image data loaded in the frame memory 12 to a driver 14.

The projector 1 includes the driver 14 and a projection unit 15.

The driver 14 includes a light source drive circuit configured to turn on or off a light source 151 and a light modulation device drive circuit. The light modulation device drive circuit drives a light modulation device 152 under the control of the first controller 10, and draws an image in units of frames on a light modulation element provided in the light modulation device 152. Image data corresponding to the primary colors R, G, and B is input from the first image processor 13 to the light modulation device drive circuit. The light modulation device drive circuit converts the input image data into a data signal suitable for an operation of a liquid crystal panel that is a light modulation element provided in the light modulation device 152. The light modulation device drive circuit applies a voltage to each pixel of each liquid crystal panel based on the converted data signal, and draws an image on each liquid crystal panel.

The projection unit 15 includes the light source 151, the light modulation device 152, and an optical unit 153.

The light source 151 includes a light source such as a xenon lamp, an extra-high pressure mercury lamp, an LED, or a laser light source. The light source 151 may include a reflector and an auxiliary reflector that guide light emitted by the light source to the light modulation device 152.

The light modulation device 152 includes, for example, a modulation element such as a transmissive liquid crystal panel. The light modulation device 152 modulates light incident from the light source 151 according to a data signal input from the drive circuit to form image light. The image light is typically color image light including visible light of three colors of R, G, and B. The light modulation device 152 is not limited to the transmissive liquid crystal panel, and may be, for example, a reflective liquid crystal panel or a digital micromirror device (DMD).

The optical unit 153 emits the image light formed by the light modulation device 152 onto the screen SC to form an image on the screen SC. The optical unit 153 includes at least one of a lens and a mirror. The optical unit 153 may include a zoom mechanism configured to enlarge or reduce the projection image G projected on the screen SC, and a focus adjustment mechanism configured to perform a focus adjustment.

The first processor 100 functions as a first communication controller 101 and a projection controller 102 by reading and executing the control program 111 stored in the first memory 110.

The first communication controller 101 communicates with the control device 2 via the first interface 11.

The projection controller 102 controls the first image processor 13, the driver 14, and the like to project the projection image G on the screen SC. Specifically, the projection controller 102 causes the first image processor 13 to process the image data loaded in the frame memory 12. At this time, the projection controller 102 reads parameters necessary for processing of the first image processor 13 from the first memory 110 and outputs the parameters to the first image processor 13. In addition, the projection controller 102 controls the driver 14 to turn on the light source 151 by the light source drive circuit, drive the light modulation device 152 by the light modulation device drive circuit, and emit image light by the projection unit 15 to project the projection image G on the screen SC. In addition, the projection controller 102 controls the optical unit 153 to activate a motor, and adjusts the zoom and the focus of the optical unit 153.

Figure 3:
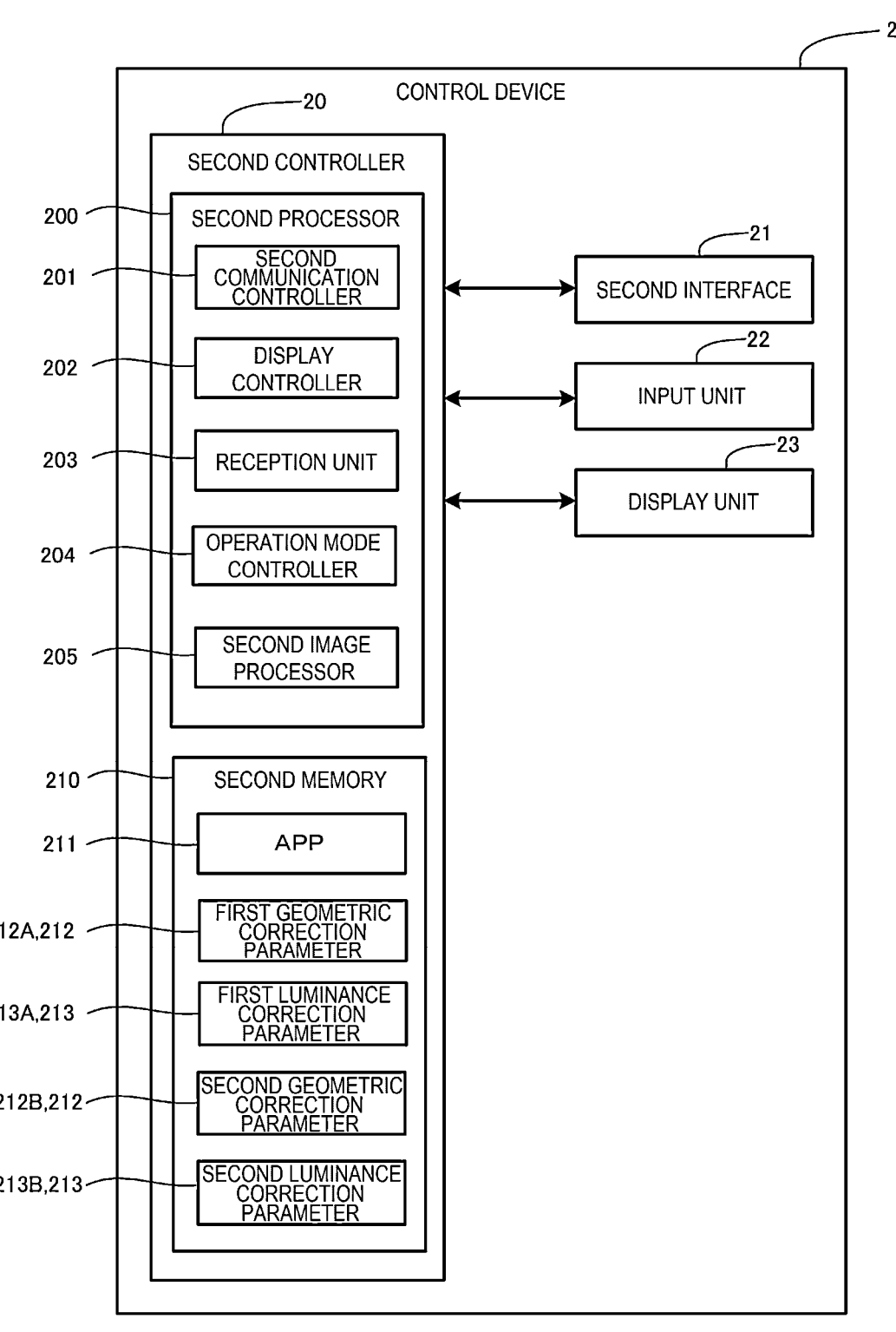
FIG. 3 is a diagram illustrating a configuration of a control device.

FIG. 3 is a diagram illustrating a configuration of the control device 2.

The control device 2 includes a second controller 20, a second interface 21, an input unit 22, and a display unit 23.

The second controller 20 includes a second processor 200 configured to execute programs such as a CPU and an MPU, and a second memory 210, and controls each unit of the control device 2. Functional units of the second processor 200 will be described later.

The second processor 200 corresponds to one or more processors of the present disclosure.

The second memory 210 stores programs to be executed by the second processor 200 and data processed by the second processor 200. The second memory 210 stores an APP 211 executed by the second processor 200, a geometric correction parameter 212, a luminance correction parameter 213, and other various types of data. The second memory 210 includes a nonvolatile storage area. The second memory 210 includes a volatile storage area, and may constitute a work area of the second processor 200. The second memory 210 includes, for example, a ROM and a RAM.

The APP 211 is an example of a program of the present disclosure. The geometric correction parameter 212 corresponds to a first setting value of the present disclosure. The luminance correction parameter 213 corresponds to a second setting value of the present disclosure.

The APP 211 is an application program configured to control the projector 1.

The geometric correction parameter 212 is a parameter for correcting a shape of the projection image G.

The luminance correction parameter 213 is a setting value for correcting the luminance of the overlapping area TA. More specifically, the luminance correction parameter 213 is an alpha map that defines an alpha value for each pixel of the projection image G. The control device 2 acquires an initial value of the luminance correction parameter 213 by input from a user or measurement of a camera or the like.

The second memory 210 stores the geometric correction parameter 212 and the luminance correction parameter 213 for each projector 1 controlled by the control device 2. The second memory 210 of the embodiment stores a first geometric correction parameter 212A that is the geometric correction parameter 212 of the projector 1A, a second geometric correction parameter 212B that is the geometric correction parameter 212 of the projector 1B, a first luminance correction parameter 213A that is the luminance correction parameter 213 of the projector 1A, and a second luminance correction parameter 213B that is the luminance correction parameter 213 of the projector 1B.

The control device 2 includes the second interface 21.

The second interface 21 includes a connector, an interface circuit and the like conforming to a predetermined communication standard. The second interface 21 transmits and receives image data, control data, and the like to and from an external device according to the predetermined communication standard under the control of the second controller 20. The second interface 21 of the embodiment communicates with the projector 1 via the network NW and transmits image data of the projection image G to the projector 1.

The input unit 22 includes an operation switch provided in the control device 2 and an input device such as a panel having a touch input function, a mouse, and a keyboard, detects an operation on the input device performed by the user, and outputs a detection result to the second controller 20. Based on an input from the input unit 22, the second controller 20 executes processing corresponding to an operation on the input device.

The display unit 23 includes a display, and displays information on the display under the control of the second controller 20. The display unit 23 includes a display including various display panels such as a liquid crystal display panel and an organic electro luminescence (EL) display panel.

The second processor 200 functions as a second communication controller 201, a display controller 202, a reception unit 203, an operation mode controller 204, and a second image processor 205 by reading and executing the APP 211.

The second communication controller 201 communicates with the projector 1 via the second interface 21.

When a manual adjustment of the projection image G is executed, the display controller 202 displays, on the display unit 23, a user interface for executing the manual adjustment of the projection image G. The manual adjustment of the projection image G refers to manually adjusting the projection image G. Hereinafter, this user interface is referred to as a "manual adjustment UI" and denoted by a reference numeral "230". The UI is an abbreviation of "user interface".

The manual adjustment of the projection image G corresponds to a first adjustment of the present disclosure.

Figure 4:
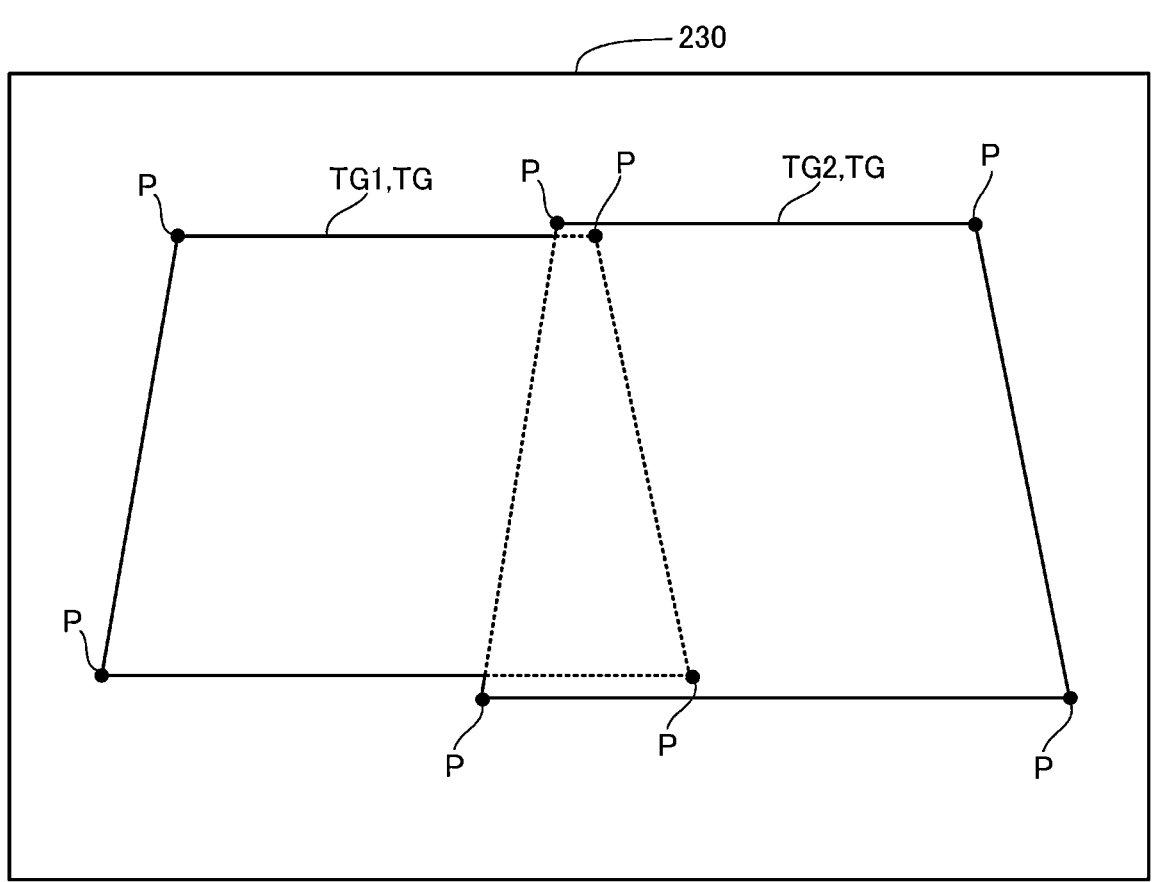
FIG. 4 is a diagram illustrating an example of a manual adjustment UI.

FIG. 4 is a diagram illustrating an example of the manual adjustment UI 230.

The manual adjustment UI 230 displays an adjustment image TG for manually adjusting the projection image G. The projection system 1000 according to the embodiment includes two projectors 1. Accordingly, the manual adjustment UI 230 of the embodiment displays a first adjustment image TG1 for manually adjusting the first projection image G1 and a second adjustment image TG2 for manually adjusting the second projection image G2. The adjustment image TG is a rectangular image. The adjustment image TG has an operation point P at each vertex. The operation point P is a point to be operated by the user to correct the shape of the projection image G. A position of each of the operation points P on the manual adjustment UI 230 is changed according to the operation of the user.

The adjustment images TG displayed on the manual adjustment UI 230 correspond to the projection images G projected onto the screen SC, respectively. In the embodiment, the first adjustment image TG1 corresponds to the first projection image G1, and the second adjustment image TG2 corresponds to the second projection image G2.

Regarding each adjustment image TG displayed on the manual adjustment UI 230, a display position, a shape, and a size thereof on the manual adjustment UI 230 correspond to a projection position, a shape, and a size of the corresponding projection image G. In the embodiment, a display position, a shape, and a size of the first adjustment image TG1 on the manual adjustment UI 230 correspond to a projection position, a shape, and a size of the first projection image G1 on the screen SC. In the embodiment, a display position, a shape, and a size of the second adjustment image TG2 on the manual adjustment UI 230 correspond to a projection position, a shape, and a size of the second projection image G2 on the screen SC.

In the projection system 1000, when the shape of the adjustment image TG is changed, the shape of the corresponding projection image G is changed to a shape of the adjustment image TG after the change. Accordingly, the user can intuitively adjust the shape of the projection image G using the manual adjustment UI 230.

Referring back to FIG. 3, the reception unit 203 receives various operations of the user via the input unit 22. The reception unit 203 receives a drag-and-drop operation of moving the position of the operation point P via the manual adjustment UI 230. The drag-and-drop operation includes a drag operation and a drop operation.

The drag operation includes an operation of selecting an operation target and an operation of changing a position of the operation target in a selected state. For example, when the user operates the operation point P using a mouse coupled to the control device 2, the drag operation is an operation of moving the operation point P while clicking the operation point P. For example, when the user operates the operation point P by a touch operation on the touch panel, the drag operation is an operation of moving the operation point P in a state in which the operation point P is touched.

The drop operation is an operation of canceling the selection of the operation target. For example, when the user operates the operation point P using a mouse coupled to the control device 2, the drop operation is an operation of stopping clicking on the operation point P. For example, when the user operates the operation point P by a touch operation on the touch panel, the drop operation is an operation of stopping the touch operation on the operation point P.

The operation mode controller 204 controls an operation mode of the control device 2. The operation mode of the control device 2 of the embodiment includes a non-manual adjustment mode and a manual adjustment mode.

The non-manual adjustment mode is a mode in which the projection image G is not manually adjusted.

The manual adjustment mode is a mode in which the projection image G is manually adjusted. The manual adjustment mode includes a first manual adjustment mode and a second manual adjustment mode.

The first manual adjustment mode is a mode in which the shape of the projection image G is corrected and the luminance of the overlapping area TA is not corrected.

The second manual adjustment mode is a mode in which the shape of the projection image G and the luminance of the overlapping area TA are corrected.

When the reception unit 203 receives an operation to start the manual adjustment, the operation mode controller 204 switches the operation mode of the control device 2 from the non-manual adjustment mode to the manual adjustment mode. When the reception unit 203 receives an operation to end the manual adjustment, the operation mode controller 204 switches the operation mode of the control device 2 from the manual adjustment mode to the non-manual adjustment mode.

In the manual adjustment mode, when the reception unit 203 receives a drag operation of the operation point P, the operation mode controller 204 switches the operation mode of the control device 2 from the second manual adjustment mode to the first manual adjustment mode. In the manual adjustment mode, when the reception unit 203 receives the drop operation of the operation point P, the operation mode controller 204 switches the operation mode of the control device 2 from the first manual adjustment mode to the second manual adjustment mode.

When the operation mode of the control device 2 is the non-manual adjustment mode, the second image processor 205 reads the geometric correction parameter 212 and the luminance correction parameter 213 from the second memory 210. The second image processor 205 generates a fourth projection image based on the read two types of parameters. The fourth projection image is an image for which the shape of the projection image G is corrected based on the read geometric correction parameter 212, and the overlapping area TA is alpha blended based on the read luminance correction parameter 213. The second image processor 205 outputs image data of the generated fourth projection image to the second communication controller 201. The second communication controller 201 transmits the image data of the fourth projection image to the projector 1.

In the embodiment, the second image processor 205 reads the first geometric correction parameter 212A and the first luminance correction parameter 213A from the second memory 210. Then, the second image processor 205 generates the fourth projection image for which the shape is corrected based on the read first geometric correction parameter 212A and the overlapping area TA is alpha blended based on the read first luminance correction parameter 213A. The second communication controller 201 transmits the image data of the generated fourth projection image to the projector 1A.

In the embodiment, the second image processor 205 reads the second geometric correction parameter 212B and the second luminance correction parameter 213B from the second memory 210. Then, the second image processor 205 generates the fourth projection image for which the shape is corrected based on the read second geometric correction parameter 212B and the overlapping area TA is alpha blended based on the read second luminance correction parameter 213B. The second communication controller 201 transmits image data of the generated fourth projection image to the projector 1B.

Here, image processing of the second image processor 205 in the case of generating the fourth projection image will be described.

Figure 5:
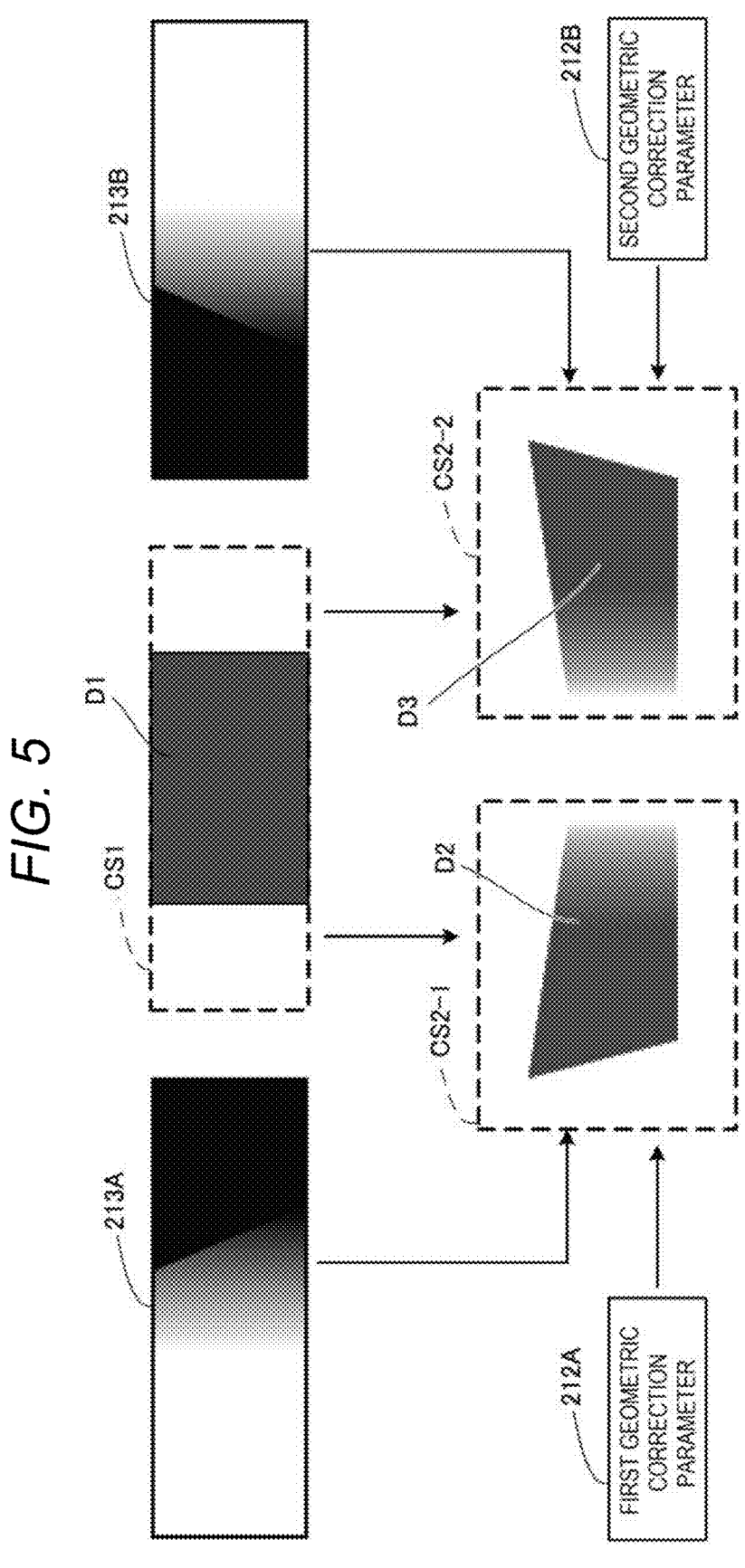
FIG. 5 is a diagram illustrating a flow of image processing of a second image processor.

FIG. 5 is a diagram illustrating a flow of image processing of the second image processor 205.

The second image processor 205 allocates image data D1 of one image to be projected onto the screen SC by the projection system 1000 to a screen coordinate system CS1 loaded in a predetermined storage area of the second memory 210. When allocating the image data D1, the second image processor 205 allocates the image data D1 while maintaining an aspect of the image. The screen coordinate system CS1 is a coordinate system defined for the screen SC. Information on the screen coordinate system CS1 is given to the control device 2 in advance by measurement of a camera or the like.

Next, the second image processor 205 converts coordinates of the image data D1 loaded in the screen coordinate system CS1 according to first conversion information for converting the screen coordinate system CS1 into a panel coordinate system CS2-1 of the projector 1A, thereby loading image data D2 in the panel coordinate system CS2-1 of the projector 1A. The panel coordinate system CS2-1 is a coordinate system defined in a liquid crystal panel provided in the light modulation device 152. Information on the panel coordinate system CS2-1 is given to the control device 2 in advance by input of the user or measurement of a camera or the like. The first conversion information is given to the control device 2 in advance by measurement performed using a camera or the like.

Next, the second image processor 205 performs geometric correction based on the first geometric correction parameter 212A on the image data D2 loaded in the panel coordinate system CS2-1 of the projector 1A.

Next, the second image processor 205 performs alpha blend on the geometrically corrected image data D2 based on the first luminance correction parameter 213A. The alpha map that is the first luminance correction parameter 213A is illustrated in the screen coordinate system CS1. The second image processor 205 uses the first conversion information to apply the alpha value defined in the alpha map to the image data D2 loaded in the panel coordinate system CS2-1 of the projector 1A.

In FIG. 5, the image indicated by the image data D2 subjected to the geometric correction and the alpha blend is the fourth projection image to be projected by the projector 1A. Through the image processing described above, the second image processor 205 generates the fourth projection image to be projected by the projector 1A.

The second image processor 205 converts the coordinates of the image data D1 loaded in the screen coordinate system CS1 according to second conversion information for converting the screen coordinate system CS1 into a panel coordinate system CS2-2 of the projector 1B, thereby loading image data D3 in the panel coordinate system CS2-2 of the projector 1B. The panel coordinate system CS2-2 is a coordinate system defined in the liquid crystal panel included in the light modulation device 152. Information on the panel coordinate system CS2-2 is given to the control device 2 in advance by input of the user or measurement of a camera or the like. The second conversion information is given to the control device 2 in advance by measurement performed using a camera or the like.

Next, the second image processor 205 performs the geometric correction based on the second geometric correction parameter 212B on the image data D3 loaded in the panel coordinate system CS2-2 of the projector 1B.

Next, the second image processor 205 performs alpha blend on the geometrically corrected image data D3 based on the second luminance correction parameter 213B. The alpha map that is the second luminance correction parameter 213B is illustrated in the screen coordinate system CS1. The second image processor 205 uses the second conversion information to apply the alpha value defined in the alpha map to the image data D3 loaded in the panel coordinate system CS2-2 of the projector 1B.

In FIG. 5, the image indicated by the image data D3 subjected to the geometric correction and the alpha blend is the fourth projection image to be projected by the projector 1B. Through the image processing described above, the second image processor 205 generates the fourth projection image to be projected by the projector 1B.

When the operation mode of the control device 2 is the first manual adjustment mode, the second image processor 205 reads, from the second memory 210, the geometric correction parameter 212 of the projector 1 corresponding to the adjustment image TG of which the operation point P is operated. The second image processor 205 updates the read geometric correction parameter 212 according to the drag operation received by the reception unit 203. More specifically, the second image processor 205 updates the read geometric correction parameter 212 so that the shape of the projection image G projected by the projector 1 becomes the shape of the adjustment image TG of which the operation point P is operated. Then, the second image processor 205 generates a third projection image based on the updated geometric correction parameter 212. The third projection image is an image in which the shape of the projection image G is corrected and the overlapping area TA is not alpha blended. The third projection image may be an image dedicated to manual adjustment of the projection image G. Examples of the image dedicated to manual adjustment include an image in which all pixels have the same color.

The second image processor 205 outputs image data of the generated third projection image to the second communication controller 201. The second communication controller 201 transmits the image data of the third projection image received from the second image processor 205 to the projector 1 corresponding to the adjustment image TG of which the operation point P is operated.

When the operation mode of the control device 2 is the second manual adjustment mode, the second image processor 205 reads the geometric correction parameter 212 and the luminance correction parameter 213 stored in the second memory 210. Next, the second image processor 205 updates the read geometric correction parameter 212 so that the shape of the projection image G becomes the shape of the adjustment image TG. In addition, the second image processor 205 updates the read luminance correction parameter 213 so that the overlapping area TA corresponding to the area where the adjustment images TG overlap is alpha blended. Then, the second image processor 205 generates a fifth projection image based on the updated geometric correction parameter 212 and the updated luminance correction parameter 213. The fifth projection image is an image in which the shape of the projection image G is corrected and the overlapping area TA is alpha blended.

Similarly to the third projection image, the fifth projection image may be an image dedicated to manual adjustment of the projection image G.

The second image processor 205 outputs image data of the generated fifth projection image to the second communication controller 201. The second communication controller 201 transmits the image data of the fifth projection image to the projector 1.

In the embodiment, when the operation mode of the control device 2 is the second manual adjustment mode, the second image processor 205 reads and updates the geometric correction parameter 212 and the luminance correction parameter 213 of each of the projectors 1A and 1B. Next, the second image processor 205 generates the fifth projection image for each of the first projection image G1 and the second projection image G2. Then, the second communication controller 201 transmits the image data of the fifth projection images to the projectors 1A and 1B correspondingly.

Next, operations of the control device 2 related to the adjustment of the projection image G will be described.

Figure 6:
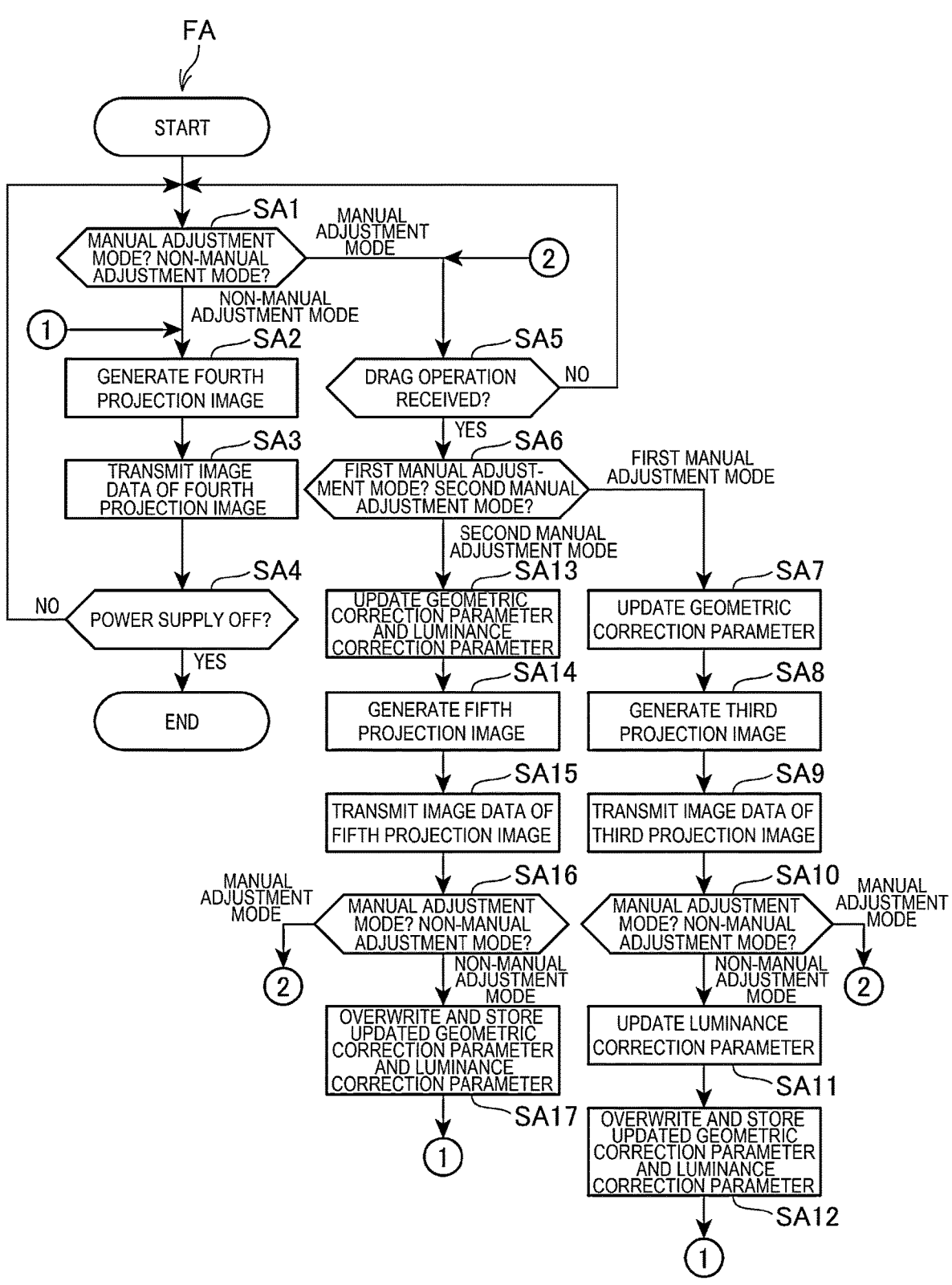
FIG. 6 is a flowchart illustrating operations of the control device.

FIG. 6 is a flowchart FA illustrating the operations of the control device 2.

The second image processor 205 determines whether the operation mode of the control device 2 is the manual adjustment mode or the non-manual adjustment mode (step SA1).

When it is determined that the operation mode of the control device 2 is the non-manual adjustment mode (step SA1: non-manual adjustment mode), the second image processor 205 generates a fourth projection image (step SA2). In the embodiment, the second image processor 205 generates the fourth projection image for each of the projectors 1A and 1B.

Next, the second communication controller 201 transmits image data of the fourth projection image generated in step SA2 to the projector 1 (step SA3). In the embodiment, the second communication controller 201 transmits the image data of the fourth projection image to each of the projectors 1A and 1B. The projection controller 102 of the projectors 1A and 1B projects the fourth projection image indicated by the image data received by the first communication controller 101.

Next, the second processor 200 determines whether a power supply of the control device 2 is turned off (step SA4). When it is determined that the power supply of the control device 2 is not turned off (step SA4: NO), the second processor 200 returns the process to step SA1. On the other hand, when it is determined that the power supply of the control device 2 is turned off (step SA4: YES), the second processor 200 ends the process.

Returning to the description of step SA1, when it is determined that the operation mode of the control device 2 is the manual adjustment mode (step SA1: manual adjustment mode), the second image processor 205 determines whether the reception unit 203 receives a drag operation on the operation point P (step SA5).

When the second image processor 205 determines that the reception unit 203 does not receive a drag operation on the operation point P (step SA5: NO), the second processor 200 returns the process to step SA1.

On the other hand, when it is determined that the reception unit 203 receives a drag operation on the operation point P (step SA5: YES), the second image processor 205 determines whether the operation mode of the control device 2 is the first manual adjustment mode or the second manual adjustment mode (step SA6).

When it is determined that the operation mode of the control device 2 is the first manual adjustment mode (step SA6: first manual adjustment mode), the second image processor 205 reads the geometric correction parameter 212 from the second memory 210 and updates the read geometric correction parameter 212 according to the drag operation (step SA7). For example, when the operation point P on which the drag operation is performed is the vertex of the first adjustment image TG1, the second image processor 205 reads the geometric correction parameter 212 of the projector 1A and updates the read geometric correction parameter 212 according to the drag operation.

Next, the second image processor 205 generates a third projection image based on the geometric correction parameter 212 updated in step SA7 (step SA8).

Next, the second communication controller 201 transmits image data of the third projection image generated in step SA8 to the projector 1 (step SA9). The projector 1 to which the image data of the third projection image is transmitted in step SA9 is the projector 1 corresponding to the adjustment image TG of which the operation point P is operated by the drag operation. For example, when the operation point P on which the drag operation is performed is the vertex of the first adjustment image TG1, the second communication controller 201 transmits the image data of the third projection image to the projector 1A. For example, when the operation point P on which the drag operation is performed is the vertex of the second adjustment image TG2, the second communication controller 201 transmits the image data of the third projection image to the projector 1B. The projection controller 102 of the projector 1 projects the third projection image indicated by the image data received by the first communication controller 101.

Next, the second image processor 205 determines whether the operation mode of the control device 2 is the manual adjustment mode or the non-manual adjustment mode (step SA10). When the second image processor 205 determines that the operation mode is the manual adjustment mode (step SA10: manual adjustment mode), the second processor 200 returns the process to step SA5.

On the other hand, when it is determined that the operation mode of the control device 2 is the non-manual adjustment mode (step SA10: non-manual adjustment mode), the second image processor 205 updates the luminance correction parameter 213 (step SA11). In step SA11, the second image processor 205 updates the luminance correction parameter 213 so that the overlapping area TA corresponding to the area where the adjustment images TG overlap is alpha blended.

Next, the second image processor 205 overwrites the geometric correction parameter 212 updated in step SA7 and the luminance correction parameter 213 updated in step SA11 in the second memory 210 (step SA12). Next, the second processor 200 advances the process to step SA2.

Returning to step SA6, when it is determined that the operation mode of the control device 2 is the second manual adjustment mode (step SA6: second manual adjustment mode), the second image processor 205 reads the geometric correction parameter 212 and the luminance correction parameter 213 from the second memory 210, and updates the read two types of parameters (step SA13).

Next, the second image processor 205 generates a fifth projection image based on the geometric correction parameter 212 and the luminance correction parameter 213 updated in step SA13 (step SA14). In the embodiment, the second image processor 205 generates the fifth projection image for each of the projectors 1A and 1B.

Next, the second communication controller 201 transmits image data of the fifth projection image generated in step SA14 to the projector 1 (step SA15). In the embodiment, the second communication controller 201 transmits the image data of the fifth projection image to each of the projectors 1A and 1B. The projection controller 102 of the projectors 1A and 1B projects the fifth projection image indicated by the image data received by the first communication controller 101.

Next, the second image processor 205 determines whether the operation mode of the control device 2 is the manual adjustment mode or the non-manual adjustment mode (step SA16). When the second image processor 205 determines that the operation mode of the control device 2 is the manual adjustment mode (step SA16: manual adjustment mode), the second processor 200 returns the process to step SA5.

On the other hand, when it is determined that the operation mode of the control device 2 is the non-manual adjustment mode (step SA16: non-manual adjustment mode), the second image processor 205 overwrites and stores the geometric correction parameter 212 and the luminance correction parameter 213 updated in step SA13 in the second memory 210 (step SA17). Next, the second processor 200 advances the process to step SA2.

2. Second Embodiment

Next, a second embodiment will be described.

Since a configuration of each unit of the projection system 1000 according to the second embodiment is common to that of the first embodiment, illustration and description of the configuration of each unit of the projection system 1000 are omitted.

The second embodiment is different from the first embodiment in the manual adjustment mode and the operations of the control device 2. The manual adjustment mode of the embodiment is a mode in which the shape of the projection image G is corrected and the overlapping area TA is not alpha blended. That is, the manual adjustment mode of the embodiment does not include the second manual adjustment mode.

Figure 7:
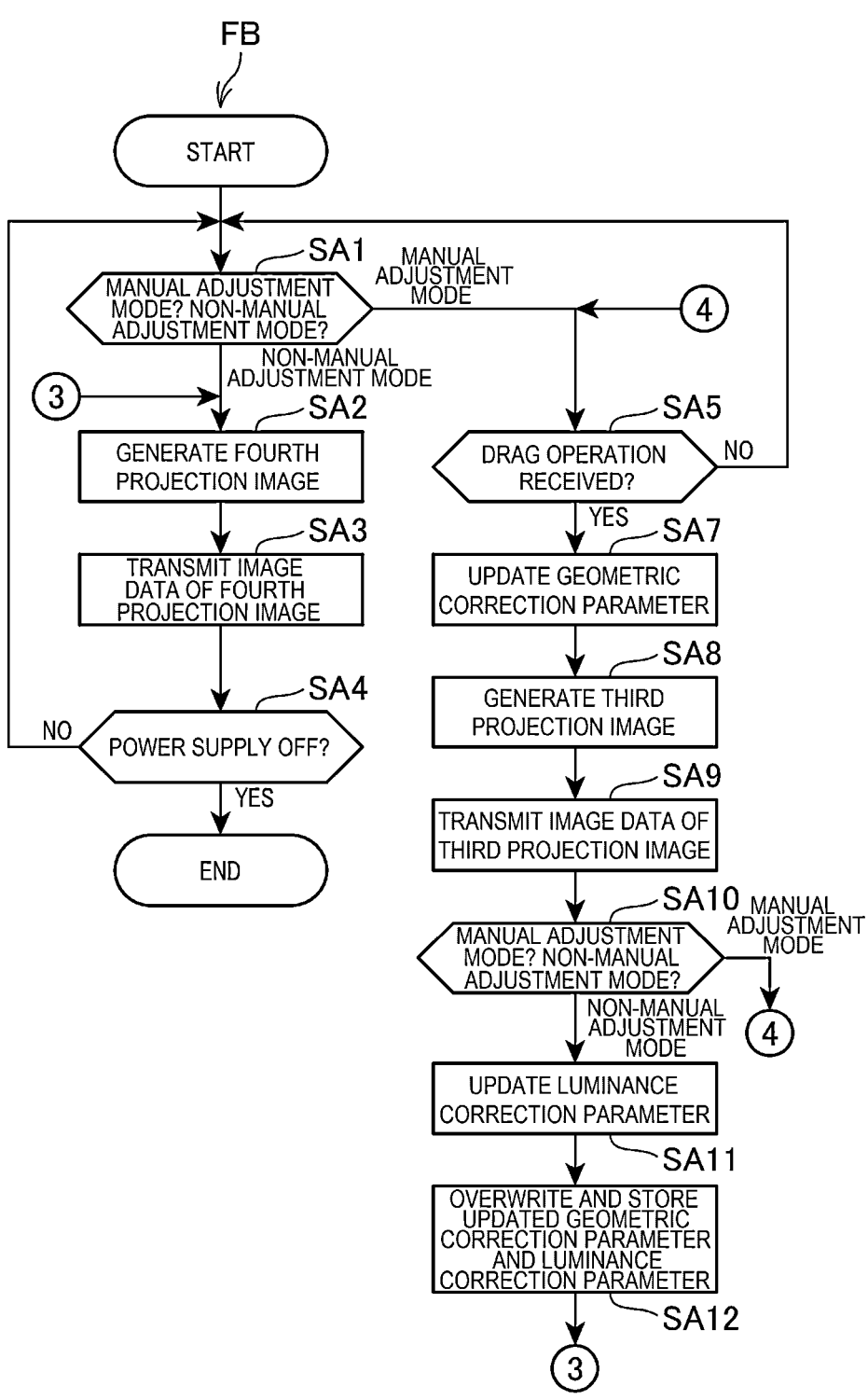
FIG. 7 is a flowchart illustrating operations of the control device.

FIG. 7 is a flowchart FB illustrating the operations of the control device 2 of the second embodiment.

In the flowchart FB illustrated in FIG. 7, the same steps as those in the flowchart FA illustrated in FIG. 6 are denoted by the same step numbers, and a detailed description thereof is omitted.

In the embodiment, when it is determined in step SA5 that a drag operation is received by the reception unit 203 (step SA5: YES), the second processor 200 proceeds to step SA7.

3. Third Embodiment

Next, a third embodiment will be described.

Since a configuration of each unit of the projection system 1000 according to the third embodiment is common to that of the first embodiment, illustration and description of the configuration of each unit of the projection system 1000 are omitted.

The third embodiment is different from the first and second embodiments in the operation mode of the control device 2, the operations of the display controller 202, the operations of the operation mode controller 204, and the operations of the control device 2.

The operation mode of the control device 2 of the embodiment includes a geometric correction mode and a non-geometric correction mode.

The geometric correction mode is a mode in which geometric correction of the projection image G is manually performed. The geometric correction mode is a mode corresponding to the first manual adjustment mode described above.

The non-geometric correction mode is a mode in which the geometric correction of the projection image G is not manually performed.

The manual geometric correction of the projection image G corresponds to the first adjustment of the present disclosure.

When the geometric correction of the projection image G is manually executed, the display controller 202 of the third embodiment displays the manual adjustment UI 230 on the display unit 23.

When the reception unit 203 receives an operation to start the manual geometric correction, the operation mode controller 204 of the third embodiment switches the operation mode of the control device 2 from the non-geometric correction mode to the geometric correction mode. When the reception unit 203 receives an operation to end the manual geometric correction, the operation mode controller 204 of the third embodiment switches the operation mode of the control device 2 from the geometric correction adjustment mode to the non-geometric correction adjustment mode.

Figure 8:
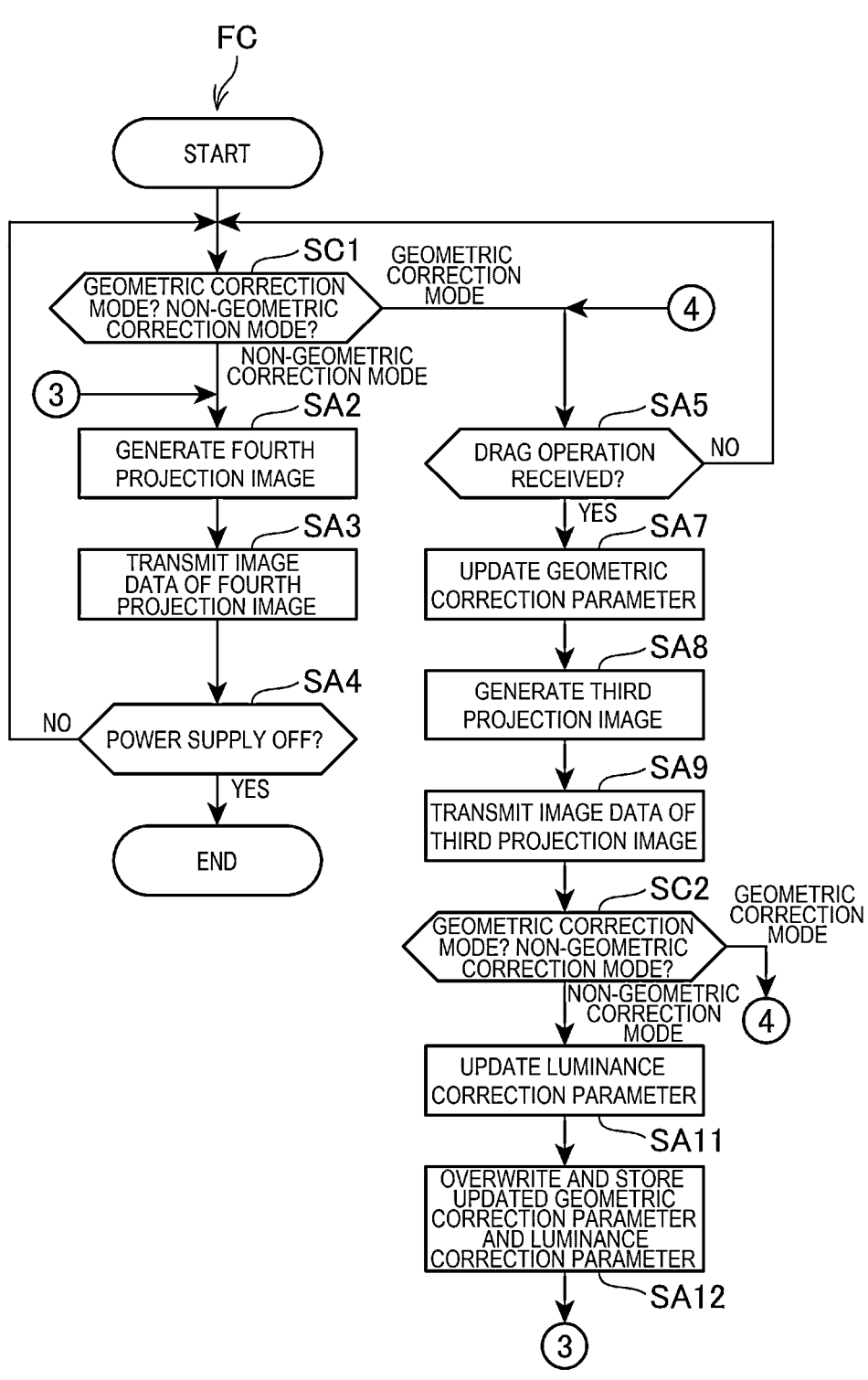
FIG. 8 is a flowchart illustrating operations of the control device.

FIG. 8 is a flowchart FC illustrating the operations of the control device 2 of the third embodiment.

In the flowchart FC illustrated in FIG. 8, the same steps as those in the flowchart FB illustrated in FIG. 7 are denoted by the same step numbers, and a detailed description thereof is omitted.

In step SC1, the second image processor 205 determines whether the operation mode of the control device 2 is the geometric correction mode or the non-geometric correction mode.

When the second image processor 205 determines that the operation mode of the control device 2 is the non-geometric correction mode (step SC1: non-geometric correction mode), the process is advanced to step SA2. On the other hand, when the second image processor 205 determines that the operation mode of the control device 2 is the geometric correction mode (step SC1: geometric correction mode), the process is advanced to step SA5.

In step SC2, the second image processor 205 determines whether the operation mode of the control device 2 is the geometric correction mode or the non-geometric correction mode. When the second image processor 205 determines that the operation mode of the control device 2 is the geometric correction mode (step SC2: geometric correction mode), the second processor 200 returns the process to step SA5.

On the other hand, when the second image processor 205 determines that the operation mode of the control device 2 is the non-geometric correction mode (step SC2: non-geometric correction mode), the process is advanced to step SA11.

4. Other Embodiments

The above-described embodiments are preferred embodiments of the present disclosure. The present disclosure is not limited to the above-described embodiments, and various modifications can be made without departing from the gist of the present disclosure.

In the above-described embodiments, the case where the control device 2 is the processing device of the present disclosure is exemplified. However, the processing device of the present disclosure is not limited to the control device 2. The processing device of the present disclosure may be an electronic device such as a video distributor having a function of adjusting the projection image G. The processing device of the present disclosure may be the projector 1. In this case, the control device 2 may be built in the projector 1. When the processing device of the present disclosure is the projector 1, the projector 1 mainly adjusts the projection image G. When the processing device of the present disclosure is the projector 1, the projector 1 receives a drag-and-drop operation by a remote controller or a coupled mouse, or by an electronic pen or a touch operation on the screen SC in a case of an interactive projector.

In the above-described embodiments, the case is exemplified in which the operation of changing the shape of the projection image G is the operation of changing the position of the vertex. In another embodiment, the operation of changing the shape of the projection image G may be an operation of changing a position of a contour indicating the shape of the projection image G.

In the above-described embodiments, the alpha blend is exemplified as the correction of the luminance of the overlapping area TA. However, the correction of the luminance of the overlapping area TA is not limited to the alpha blend, and any type of processing may be used as long as the boundary between the adjacent projection images G is made inconspicuous by correcting the luminance.

The correction of the luminance of the overlapping area TA may be processing including correction of adjusting either brightness or color saturation of each projection image G including the overlapping area TA, or processing including correction of adjusting both the brightness and the color saturation of each projection image G.

In the above-described embodiments, the case is exemplified in which the control device 2 is an image supply device. In another embodiment, the control device 2 may not function as an image supply device. In this case, when the manual adjustment ends, the control device 2 transmits the updated geometric correction parameter 212 and luminance correction parameter 213 to the projector 1, and causes the projector 1 to apply the updated geometric correction parameter 212 and luminance correction parameter 213. Then, the projector 1 corrects the projection image G using the received two types of parameters, and projects the corrected projection image G.

The functions of the first processor 100 and the second processor 200 may be implemented by a plurality of processors or a semi-conductor chip.

In addition, the units of the projector 1 illustrated in FIG. 2 and the units of the control device 2 illustrated in FIG. 3 are functional configurations, and a specific implementation mode is not particularly limited. That is, it is not always necessary to implement hardware individually corresponding to each functional unit, and a plurality of functions may be implemented by one processor executing a program. A part of the functions implemented by software in the above-described embodiments may be implemented by hardware, or a part of the functions implemented by hardware may be implemented by software. In addition, specific detailed configurations of the other units of the projector 1 and the control device 2 can be freely changed without departing from the gist of the present disclosure.

In addition, processing units of the flowcharts illustrated in FIGS. 6, 7, and 8 are divided according to the main processing content in order to facilitate understanding of the processing of the control device 2, and the present disclosure is not limited by the way or the name of division of the processing units. The flow may be divided into many step units according to the processing content. Further, one step unit may be divided to include many types of processing. In addition, an order of the steps may be appropriately changed within a range that does not interfere with the gist of the present disclosure.

5. Summary of Present Disclosure

Hereinafter, a summary of the present disclosure will be added.

(Appendix 1) A projection method including: when executing a first adjustment including correction of a shape of a first projection image to be projected by a projector, updating a first setting value for correcting the shape of the first projection image by receiving an operation of changing the shape of the first projection image; and projecting, from the projector, a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

Accordingly, in the adjustment including the correction of the shape of the projection image, since the correction of the luminance of the overlapping area where the projection images overlap each other is not performed, it is possible to shorten the time required until the projection image after the adjustment is projected. Accordingly, it is possible to improve convenience for the user in the adjustment of projection images projected by the plurality of projectors.

(Appendix 2) The projection method according to Appendix 1 including: in a case where an operation to end the first adjustment is received when executing the first adjustment, changing a projection image to be projected from the projector from the third projection image to a fourth projection image obtained by correcting the luminance and the shape of the first projection image based on the first setting value and a second setting value for correcting the luminance.

Accordingly, when the execution of the adjustment including the correction of the shape of the projection image is ended, it is possible to project the projection image for which the luminance of the overlapping area is corrected in addition to the shape. Accordingly, after the adjustment of the projection image, the user can confirm whether the luminance of the overlapping area is appropriately adjusted together with the shape.

(Appendix 3) In the projection method according to Appendix 1 or Appendix 2, the first adjustment indicates an adjustment of the first projection image according to an operation received from a user.

Accordingly, when an operation of adjusting the projection image is received from the user, the luminance of the overlapping area where the projection images overlap each other is not corrected, and thus a time until the projection image after the manual adjustment is projected can be shortened. Accordingly, it is possible to improve the convenience for the user in the manual adjustment of the projection image.

(Appendix 4) In the projection method according to any one of Appendix 1 to Appendix 3, the receiving an operation of changing the shape of the first projection image includes receiving a change in a position of a contour indicating the shape of the first projection image or a change in a position of a vertex of the first projection image.

Accordingly, since the operation of changing the shape of the first projection image can be received by changing the position of the contour or the vertex, the user can intuitively adjust the projection image. Accordingly, it is possible to further improve the convenience for the user in the adjustment of projection images projected by a plurality of projectors.

(Appendix 5) In the projection method according to Appendix 4, the receiving a change in the position of the contour or the position of the vertex includes receiving a drag-and-drop operation for moving the position of the contour or the position of the vertex.

Accordingly, since the operation of changing the shape of the first projection image can be performed by the drag-and-drop operation, the user can more intuitively adjust the projection image. Accordingly, it is possible to further improve the convenience for the user in the adjustment of projection images projected by a plurality of projectors.

(Appendix 6) In the projection method according to Appendix 5, the first adjustment indicates an adjustment of executing correction of the shape of the first projection image by receiving a drag operation of moving the position of the contour or the position of the vertex.

Accordingly, the luminance of the overlapping area is not corrected while the position of the contour or the position of the vertex is moved by the drag operation. Therefore, the user can quickly confirm the shape of the projection image, on which the movement of the position of the contour or the position of the vertex is reflected, after the movement of the contour or the vertex. Accordingly, it is possible to further improve the convenience for the user in the adjustment of projection images.

(Appendix 7) A processing device including one or more processors configured to, when executing a first adjustment including correction of a shape of a first projection image to be projected by a projector, update a first setting value for correcting the shape of the first projection image by receiving an operation of changing the shape of the first projection image; and cause the projector to project a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

Accordingly, the same effect as that of the projection method described in Appendix 1 is achieved.

(Appendix 8) A projection system including: a projector; and a processing device configured to, when executing a first adjustment including correction of a shape of a first projection image to be projected by the projector, update a first setting value for correcting the shape of the first projection image by receiving an operation of changing the shape of the first projection image; and cause the projector to project a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

Accordingly, the same effect as that of the projection method described in Appendix 1 is achieved.

(Appendix 9) A non-transitory computer-readable storage medium storing a program, the program including: causing one or more processors to, when executing a first adjustment including correction of a shape of a first projection image to be projected by a projector, update a first setting value for correcting the shape of the first projection image by receiving an operation of changing the shape of the first projection image; and cause the projector to project a third projection image in which the shape of the first projection image is corrected based on the first setting value and a luminance of an overlapping area in the first projection image is not corrected, the overlapping area being an area where a second projection image projected by another projector different from the projector and the first projection image overlap with each other.

Accordingly, the same effect as that of the projection method described in Appendix 1 is achieved.

What is claimed is:

1. A projection method comprising:

when executing a first adjustment including correction of a shape of a first projection image to be projected by a projector, updating a first setting value for correcting the shape of the first projection image by receiving an operation of changing the shape of the first projection image; and projecting, from the projector, a third projection image in which the shape of the first projection image is corrected based on the first setting value and a luminance of an overlapping area in the first projection image is not corrected, the overlapping area being an area where a second projection image projected by another projector different from the projector and the first projection image overlap with each other, and in a case where an operation of ending the first adjustment is received when executing the first adjustment, changing a projection image to be projected from the projector from the third projection image to a fourth projection image obtained by correcting the luminance and the shape of the first projection image based on the first setting value and a second setting value for correcting the luminance.

2. The projection method according to claim 1, wherein the first adjustment indicates an adjustment of the first projection image according to an operation received from a user.

3. The projection method according to claim 1, wherein the receiving an operation of changing the shape of the first projection image includes receiving a change in a position of a contour indicating the shape of the first projection image or a change in a position of a vertex of the first projection image.

4. The projection method according to claim 3, wherein the receiving a change in the position of the contour or the position of the vertex includes receiving a drag-and-drop operation for moving the position of the contour or the position of the vertex.

5. The projection method according to claim 4, wherein the first adjustment indicates an adjustment of executing correction of the shape of the first projection image by receiving a drag operation of moving the position of the contour or the position of the vertex.

6. A processing device comprising:

one or more processors configured to when executing a first adjustment including correction of a shape of a first projection image to be projected by a projector, update a first setting value for correcting the shape of the first projection image by receiving an operation of changing the shape of the first projection image, and

US 12,684,098 B2

19 cause the projector to project a third projection image in which the shape of the first projection image is corrected based on the first setting value and a luminance of an overlapping area in the first projection image is not corrected, the overlapping area being an area where a second projection image projected by another projector different from the projector and the first projection image overlap with each other; and in a case where an operation of ending the first adjustment is received when executing the first adjustment, change a projection image to be projected from the projector from the third projection image to a fourth projection image obtained by correcting the luminance and the shape of the first projection image based on the first setting value and a second setting value for correcting the luminance.

7. A non-transitory computer-readable storage medium storing a program, the program comprising:

causing one or more processors to when executing a first adjustment including correction of a shape of a first projection image to be projected by a projector,

20 update a first setting value for correcting the shape of the first projection image by receiving an operation of changing the shape of the first projection image, and cause the projector to project a third projection image in which the shape of the first projection image is corrected based on the first setting value and a luminance of an overlapping area in the first projection image is not corrected, the overlapping area being an area where a second projection image projected by another projector different from the projector and the first projection image overlap with each other; and in a case where an operation of ending the first adjustment is received when executing the first adjustment, change a projection image to be projected from the projector from the third projection image to a fourth projection image obtained by correcting the luminance and the shape of the first projection image based on the first setting value and a second setting value for correcting the luminance.

* * * * *